UNITED STATES PATENT OFFICE.

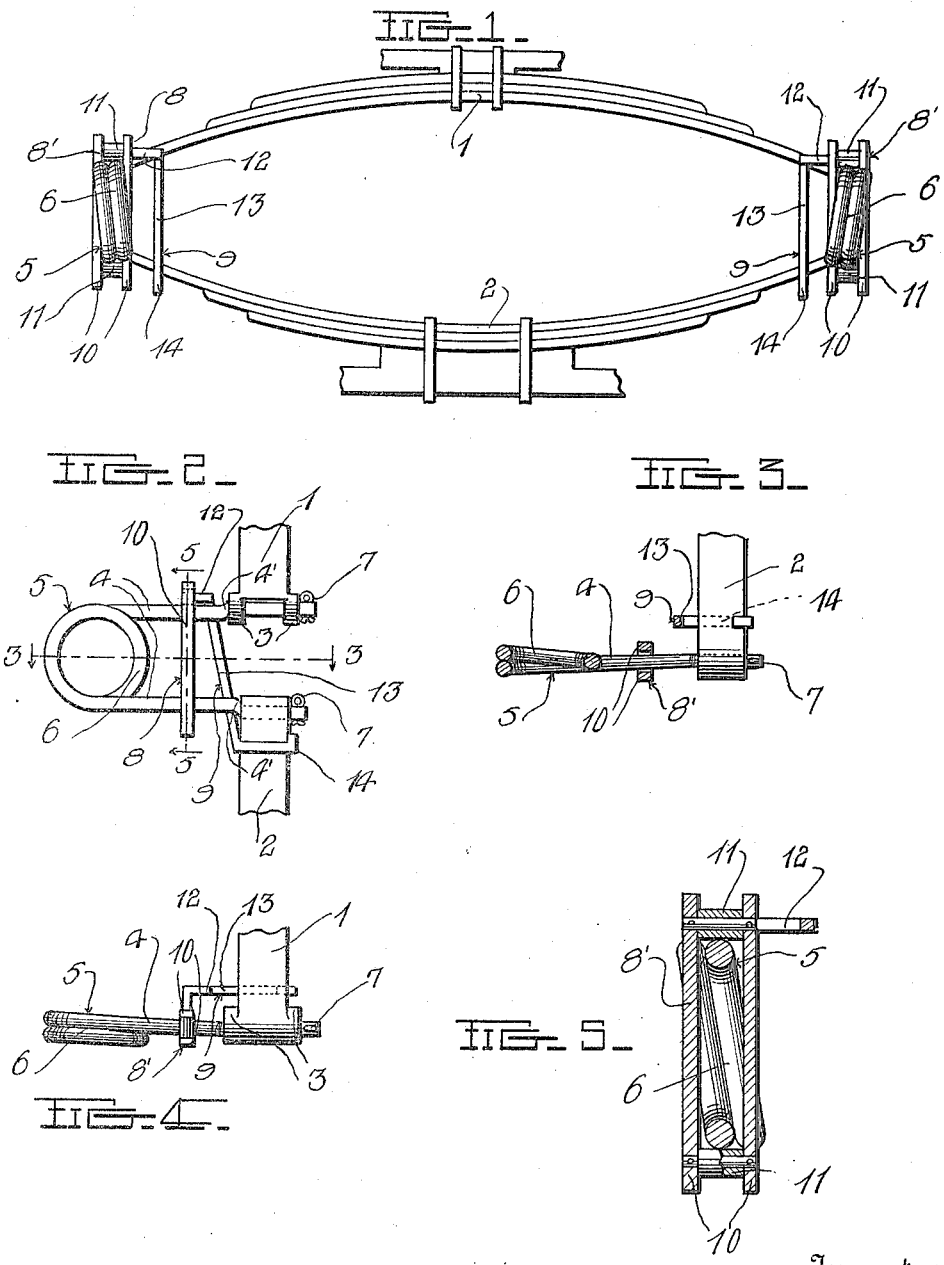

BURTON A. ELLIOTT, OF KINGSTON, MICHIGAN.

SUPPLEMENTAL SPRING.

1,190,527.  Specification of Letters Patent.  Patented July 11, 1916.

Application filed February 28, 1916. Serial No. 80,977.

*To all whom it may concern:*

Be it known that I, BURTON A. ELLIOTT, a citizen of the United States, residing at Kingston, in the county of Tuscola and State of Michigan, have invented certain new and useful Improvements in Supplemental Springs; and I do declare the following to be a full, clear, and exact description of the invention, such as will enable others skilled in the art to which it appertains to make and use the same.

This invention relates to improvements in supplemental springs which can be quickly and easily applied to the springs of buggies and other light vehicles.

The principal object of the invention is to provide a device of this character which will aid as a shock absorber in reducing the jolts and jars received by the vehicle in running over rough roads, when the same is not loaded to its capacity.

With this general object in view, my invention resides in the novel features of construction, combination and arrangement of parts which will hereinafter be more particularly described and claimed and shown in the drawings wherein:

Figure 1 represents a side elevation of an elliptical spring equipped with a pair of my improved devices; Fig. 2 is an edge view of one end of the spring showing more particularly the construction of my invention; Fig. 3 is a horizontal section taken on the line 3—3 of Fig. 2; Fig. 4 is a plan view of one end of the vehicle spring; and Fig. 5 is a vertical transverse section taken on the line 5—5 of Fig. 2.

As hereinbefore mentioned, this device is to be applied to buggies and other light vehicles, particularly that style of buggy employing transverse end springs. As shown in the drawing, these springs are preferably elliptical and comprise upper and lower sections 1 and 2 respectively. When in ordinary use, the upper section 1 which has its ends forked as shown at 3 receives the ends of the lower section 2 between the arms of said forks, these arms being apertured. Bolts extend through these apertures in the arms and through the apertures in the ends of the lower section which are alined therewith.

In carrying out my invention, these upper and lower sections are disconnected, the retaining bolts being removed. The offset portions 4' of the arms 4 of the helical spring 5 are then inserted in the apertures in the ends of the upper and lower sections, one of said arms being connected with the ends of each section. Each of these springs 5 are formed by extending the ends thereof outwardly from opposite sides of the coil 6, thus providing the parallel spaced apart arms 4, substantially straight throughout the greater portion of their length, the free ends, however, being offset as at 4'. The ends of these arms 4 after they have been passed through the eyes or apertured ends of the spring sections, are provided with fastening means, such as the cotter pins 7, or the like. The arms of the spring are held against shifting in the ends of the sections of the vehicle spring by means of these cotter pins 7 on one side thereof and the shoulders formed by the offset portions 4' at the other side. This secures the spring sections to the ends of the arms in a simple yet very effective manner. This arrangement spaces the adjacent ends of the spring sections apart a slight distance, and this provides a very efficient shock absorber which will aid the usual springs in preventing excessive jolting of the body of the vehicle. This device is particularly designed to steady a light vehicle when it is not loaded to its capacity. For instance, an ordinary buggy when only one person is riding therein, jolts about a great deal more than when two persons are riding therein, but by using this device, one person may use the vehicle with as much ease as when two are occupying the same. In passing over smooth roads, the adjacent ends of the spring sections will always remain spaced apart when there is only one occupant, but as soon as a greater load is carried, the ends of the sections come together in the position assumed before the application of the invention; that is, the ends of the upper section ride upon the ends of the lower section.

In order to retain the sections in the best operative positions and prevent longitudinal and lateral shifting thereof, and also the excessive spreading of the arms 4 of the springs, I provide a keeper 8 in the form of a yoke 8' which straddles said arms 4, said yoke being held in position by the retaining arm 9. This yoke 8' is formed of two side bars 10 having their ends spaced apart by spacing sleeves 11, said sleeves and said bars being riveted or otherwise secured together. The retaining arm 9 preferably projects laterally from the upper end of the yoke 8' as shown at 12 and then downwardly as at 13. The lower end of this downwardly extending portion 13 being then again bent laterally in a direction away from the yoke to provide the spring engaging portion 14 which extends beneath the lower section 2 of the elliptical spring, the free end of this portion 14 being bent around the leaves of the section 2 to retain the arm in position and in operative engagement therewith at all times.

From the foregoing description of the construction and operation of this improved supplemental spring and its keeper, it is obvious that I have invented an extremely efficient device which can be readily applied to any vehicle spring without any change therein except for removing the elements connecting the upper and lower sections thereof.

I claim as my invention:

1. The combination with the adjacent ends of the upper and lower sections of a vehicle spring, each of said sections having an eye thereon; of a spring, the ends thereof being extended outwardly to form a pair of parallel spaced apart arms, straight through the greater portion of their length, the free ends thereof being offset, said offset portions of said arms being disposed in said eyes, and means on the ends of said arms to hold the same in said eyes.

2. The combination with the upper and lower sections of a vehicle spring, each of said sections having an eye thereon; of a spring, the ends thereof being extended outwardly to form a pair of spaced apart arms, one of said arms being disposed in each of said eyes, a keeper on said arms to prevent lateral and longitudinal shifting of said sections, and means for retaining said keeper in operative position.

3. The combination with the upper and lower sections of a vehicle spring, each of said sections having an eye thereon; of a spring, the ends thereof being extended outwardly to form a pair of spaced apart arms, one of said arms being disposed in each of said eyes, a yoke straddling said arms to prevent excessive spreading thereof, and lateral and longitudinal shifting of said sections, and means for retaining said yoke in operative position.

4. The combination with the upper and lower sections of a vehicle spring, each of said sections having an eye thereon; of a spring, the ends thereof being extended outwardly to form a pair of spaced apart arms, one of said arms being disposed in each of said eyes, a yoke straddling said arms to prevent excessive spreading thereof, and lateral and longitudinal shifting of said sections, and a retaining arm extending from said yoke into engagement with one of said sections.

5. A device of the class described comprising a helical spring, the ends thereof being extended outwardly from opposite sides of the coil to form a pair of parallel spaced apart arms, said arms being straight throughout the greater portion of their length, the free ends thereof being offset, said offset portions being adapted to be disposed one in each eye on the ends of the upper and lower sections of a vehicle spring, and means on the ends of said arms to retain the same in said eyes.

In testimony whereof I have hereunto set my hand in presence of two subscribing witnesses.

BURTON A. ELLIOTT.

Witnesses:
 ALEX BEST,
 J. B. BEVERLEY.

Copies of this patent may be obtained for five cents each, by addressing the "Commissioner of Patents, Washington, D. C."